US011514471B2

(12) United States Patent
Chen et al.

(10) Patent No.: US 11,514,471 B2
(45) Date of Patent: Nov. 29, 2022

(54) METHOD AND SYSTEM FOR MODEL TRAINING AND OPTIMIZATION IN CONTEXT-BASED SUBSCRIPTION PRODUCT SUITE OF RIDE-HAILING PLATFORMS

(71) Applicant: Beijing DiDi Infinity Technology and Development Co., Ltd., Beijing (CN)

(72) Inventors: Ye Chen, Pleasanton, CA (US); Bo Tan, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 0 days.

(21) Appl. No.: 16/998,729

(22) Filed: Aug. 20, 2020

(65) Prior Publication Data

US 2022/0051283 A1    Feb. 17, 2022

Related U.S. Application Data

(63) Continuation of application No. 16/993,040, filed on Aug. 13, 2020.

(51) Int. Cl.
*G06Q 30/00* (2012.01)
*G06Q 30/02* (2012.01)
(Continued)

(52) U.S. Cl.
CPC ......... *G06Q 30/0226* (2013.01); *G06N 20/20* (2019.01); *G06Q 10/02* (2013.01);
(Continued)

(58) Field of Classification Search
None
See application file for complete search history.

(56) References Cited

U.S. PATENT DOCUMENTS

2011/0246280 A1 * 10/2011  Satyavolu ......... H04M 15/8044
                                                        705/14.25
2015/0134575 A1 *  5/2015  Traupman ............. G06Q 50/01
                                                        706/12
(Continued)

FOREIGN PATENT DOCUMENTS

WO    WO-2018176939 A1 * 10/2018 .............. H04W 4/40

OTHER PUBLICATIONS

Deeplizard YouTube video "Training a neural network explained", Nov. 22, 2017, www.YouTube.com (Year: 2017).*
(Continued)

*Primary Examiner* — Naresh Vig
(74) *Attorney, Agent, or Firm* — Sheppard Mullin Richter & Hampton LLP

(57) ABSTRACT

Methods, systems, and apparatus, including computer programs encoded on computer storage media, for determining a plurality of context-based subscription products in a ride-hailing platform are described. An exemplary method may include: determining a plurality of transportation contexts to which a plurality of context-based subscription products are applicable; obtaining a plurality of historical trip-requesting sessions between a plurality of riders and the ride-hailing platform, and a plurality of historical subscription products offered to the plurality of riders; constructing at least one key performance indicator (KPI) model that predicts a reward for the ride-hailing platform offering the plurality of context-based subscription products to the plurality of riders; constructing an optimization model to maximize a weighted sum of the at least one KPI model; and determining optimal values of the plurality of parameter vectors corresponding to the plurality of context-based subscription products.

19 Claims, 7 Drawing Sheets

(51) Int. Cl.
 *G06N 20/20* (2019.01)
 *G08G 1/00* (2006.01)
 *G06Q 10/02* (2012.01)

(52) U.S. Cl.
 CPC ..... *G06Q 30/0201* (2013.01); *G06Q 30/0224* (2013.01); *G06Q 30/0232* (2013.01); *G08G 1/202* (2013.01)

(56) References Cited

U.S. PATENT DOCUMENTS

2017/0142465 A1* 5/2017 Ray .................... H04N 21/2668
2017/0154348 A1 6/2017 Biswas et al.
2019/0026759 A1* 1/2019 Ratnaswamy ........ G06F 16/288
2019/0034475 A1* 1/2019 Parikh ................. G06F 16/2255
2020/0294108 A1* 9/2020 Perry .................... G06N 20/20
2020/0410625 A1* 12/2020 Chachra ................ G06Q 50/30
2022/0156254 A1* 5/2022 Bonaci ................ G06F 16/2455

OTHER PUBLICATIONS

Training an Artificial Neural Network, Dec. 2, 2019, University of Toronto, printed through www.archive.org (date is in the URL in YYYYMMDD format) (Year: 2019).*
Kendall Fortney, Pre-processing in Natural Language Machine Learning, Nov. 28, 2017, TowardsDataScienc.com (Year: 2017).*
Python Tuples, Mar. 21, 2022, w3schools.com, printed through www.archive.org (Year: 2020).*
Non-Final Office Action dated Aug. 17, 2021, issued in related U.S. Appl. No. 16/993,040 (18 pages).
Hanna Leary, "Subscription based business model benefits", Dec. 3, 2019, SwankyAgency, 2019.
Kevin Wheeler, "Lyft announces membership plan for $19.99 a month", Oct. 20, 2019, USA Today, 2019.

* cited by examiner

500 constructing a plurality of parameter vectors each representing a context-based subscription product, wherein each of the plurality of context-based subscription products corresponds to a transportation context, and when a transportation trip requested through a ride-hailing platform satisfies one of the plurality of transportation contexts, the corresponding context-based subscription sets a benefit to be applied to the transportation trip — 510 obtaining a plurality of historical trip-requesting sessions between a plurality of riders and the ride-hailing platform, and a plurality of historical context-based subscription products offered to the plurality of riders — 520 training, based on the plurality of historical trip-requesting sessions and the plurality of context-based historical subscription products, at least one key performance indicator (KPI) model that predicts a KPI value for the ride-hailing platform, wherein the KPI value indicates a reward to the ride-hailing platform for offering the plurality of context-based subscription products to the plurality of riders of the plurality of historical trip-requesting sessions, and is predicted based at least on the plurality of parameter vectors — 530 constructing an optimization model to maximize a weighted sum of the at least one KPI value generated by the at least one KPI model, wherein the optimization model comprises the plurality of parameter vectors as decision variables — 540 determining, by the computing device solving the optimization model, an optimal configuration for each of the plurality of parameter vectors, wherein the optimal configuration comprises an optimal premium and an optimal benefit of the context-based subscription product corresponding to the each parameter vector — 550

--- obtaining a plurality of historical trip-requesting sessions between a plurality of riders and a ride-hailing platform, and a plurality of historical context-based subscription products offered to the plurality of riders, wherein the plurality of historical context-based subscription products respectively correspond to a plurality of transportation contexts, and when a trip requested by a trip-requesting session satisfies one of the plurality of transportation contexts, the corresponding context-based subscription applies a benefit to the trip — 610 feeding the plurality of historical trip-requesting sessions and the plurality of historical context-based subscription products into a first machine learning model to generate a plurality of feature vectors respectively corresponding to the plurality of historical trip-requesting sessions — 620 feeding the plurality of feature vectors to a second machine learning model to predict a plurality of first probabilities for the plurality of historical trip-requesting sessions being converted to trips — 630 deduplicating the plurality of feature vectors by keeping one of multiple feature vectors corresponding to a same rider and a same subscription product to obtain a plurality of deduplicated feature vectors respectively corresponding to the plurality of riders — 640 feeding the plurality of deduplicated feature vectors to a third machine learning model to predict a plurality of second probabilities of the plurality of riders subscribing one or more of the plurality of subscription products — 650 jointly training the first machine learning model, the second machine learning model, and the third machine learning model based on the plurality of first probabilities, the plurality of second probabilities, and the plurality of historical trip-requesting sessions — 660 constructing an optimization model based on the trained first machine learning model, the trained second machine learning model, and the trained third machine learning model to search for optimal values of a plurality of parameter vectors representing a plurality of optimal subscription products — 670

FIG. 6

METHOD AND SYSTEM FOR MODEL TRAINING AND OPTIMIZATION IN CONTEXT-BASED SUBSCRIPTION PRODUCT SUITE OF RIDE-HAILING PLATFORMS

CROSS REFERENCE TO RELATED APPLICATIONS

The present application is a continuation of U.S. patent application Ser. No. 16/993,040, filed on Aug. 13, 2020, and entitled "Method and System for Determining Context-Based Subscription Product Suite in Ride-Hailing Platforms", the content of which is hereby incorporated by reference in its entirety.

TECHNICAL FIELD

The disclosure relates generally to systems and methods for determining subscription products in ride-hailing platforms, in particular, determining a context-based subscription suite in a ride-hailing environment.

BACKGROUND

Subscription products have been widely used in the ridesharing industry. A typical subscription product may provide a user with certain forms of discount for the trips at the cost of a premium. The design of pricing and other terms is critical in delivering a successful subscription product. A ridesharing platform might provide various subscription products for users to purchase. However, they usually follow some simple rules, such as $8 for a weekly subscription, $25 for a monthly subscription, 10% off when a rider takes more than a certain amount of rides. These subscriptions are usually context-blind, i.e., the promotion/discount applies to all the trips a rider takes, and it won't adjust itself for trips under different contexts (e.g., spatial contexts, temporal contexts, weather contexts). Therefore, users may not have the incentives to purchase multiple subscriptions during the same period. More importantly, these coarse-grained pricing/terms strategies are inefficient in tailoring the subscription products according to each user's specific needs under different contexts. Therefore, it is desirable to design a novel way to provide a context-based subscription suite for users using ride-hailing platforms.

SUMMARY

Various embodiments of the present specification may include systems, methods, and non-transitory computer-readable media for determining a context-based subscription suite for a ride-hailing platform.

According to one aspect, a method for determining a context-based subscription suite in a ride-hailing platform is provided. The method may comprise: constructing a plurality of parameter vectors each representing a context-based subscription product, wherein each of the plurality of context-based subscription products corresponds to a transportation context, and when a transportation trip requested through a ride-hailing platform satisfies one of the plurality of transportation contexts, the corresponding context-based subscription sets a benefit to be applied to the transportation trip; obtaining a plurality of historical trip-requesting sessions between a plurality of riders and the ride-hailing platform, and a plurality of historical context-based subscription products offered to the plurality of riders; training, based on the plurality of historical trip-requesting sessions and the plurality of context-based historical subscription products, at least one key performance indicator (KPI) model that predicts a KPI value for the ride-hailing platform, wherein the KPI value indicates a reward to the ride-hailing platform for offering the plurality of context-based subscription products to the plurality of riders of the plurality of historical trip-requesting sessions, and is predicted based at least on the plurality of parameter vectors; constructing an optimization model to maximize a weighted sum of the at least one KPI value generated by the at least one KPI model, wherein the optimization model comprises the plurality of parameter vectors as decision variables; and determining, by the computing device solving the optimization model, an optimal configuration for each of the plurality of parameter vectors, wherein the optimal configuration comprises an optimal premium and an optimal benefit of the context-based subscription product corresponding to the each parameter vector.

According to another aspect, a system for determining a context-based subscription suite in a ride-hailing platform is provided. The system may comprise one or more processors and one or more non-transitory computer-readable memories coupled to the one or more processors, the one or more non-transitory computer-readable memories storing instructions that, when executed by the one or more processors, cause the system to perform operations comprising: constructing a plurality of parameter vectors each representing a context-based subscription product, wherein each of the plurality of context-based subscription products corresponds to a transportation context, and when a transportation trip requested through a ride-hailing platform satisfies one of the plurality of transportation contexts, the corresponding context-based subscription sets a benefit to be applied to the transportation trip; obtaining a plurality of historical trip-requesting sessions between a plurality of riders and the ride-hailing platform, and a plurality of historical context-based subscription products offered to the plurality of riders; training, based on the plurality of historical trip-requesting sessions and the plurality of context-based historical subscription products, at least one key performance indicator (KPI) model that predicts a KPI value for the ride-hailing platform, wherein the KPI value indicates a reward to the ride-hailing platform for offering the plurality of context-based subscription products to the plurality of riders of the plurality of historical trip-requesting sessions, and is predicted based at least on the plurality of parameter vectors; constructing an optimization model to maximize a weighted sum of the at least one KPI value generated by the at least one KPI model, wherein the optimization model comprises the plurality of parameter vectors as decision variables; and determining, by the computing device solving the optimization model, an optimal configuration for each of the plurality of parameter vectors, wherein the optimal configuration comprises an optimal premium and an optimal benefit of the context-based subscription product corresponding to the each parameter vector.

According to yet another aspect, a non-transitory computer-readable storage medium for determining a context-based subscription suite in a ride-hailing platform is provided. The storage medium may store instructions that, when executed by one or more processors, cause the one or more processors to perform operations comprising: constructing a plurality of parameter vectors each representing a context-based subscription product, wherein each of the plurality of context-based subscription products corresponds to a transportation context, and when a transportation trip requested through a ride-hailing platform satisfies one of the plurality of transportation contexts, the corresponding context-based subscription sets a benefit to be applied to the transportation trip; obtaining a plurality of historical trip-requesting sessions between a plurality of riders and the ride-hailing platform, and a plurality of historical context-based subscription products offered to the plurality of riders; training, based on the plurality of historical trip-requesting sessions and the plurality of context-based historical subscription products, at least one key performance indicator (KPI) model that predicts a KPI value for the ride-hailing platform, wherein the KPI value indicates a reward to the ride-hailing platform for offering the plurality of context-based subscription products to the plurality of riders of the plurality of historical trip-requesting sessions, and is predicted based at least on the plurality of parameter vectors; constructing an optimization model to maximize a weighted sum of the at least one KPI value generated by the at least one KPI model, wherein the optimization model comprises the plurality of parameter vectors as decision variables; and determining, by the computing device solving the optimization model, an optimal configuration for each of the plurality of parameter vectors, wherein the optimal configuration comprises an optimal premium and an optimal benefit of the context-based subscription product corresponding to the each parameter vector.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 5 illustrates an exemplary method for determining a context-based subscription suite in a ride-hailing platform in accordance with various embodiments.

FIG. 6 illustrates another exemplary method for determining a context-based subscription suite in a ride-hailing platform in accordance with various embodiments.

DETAILED DESCRIPTION

Figure 1:
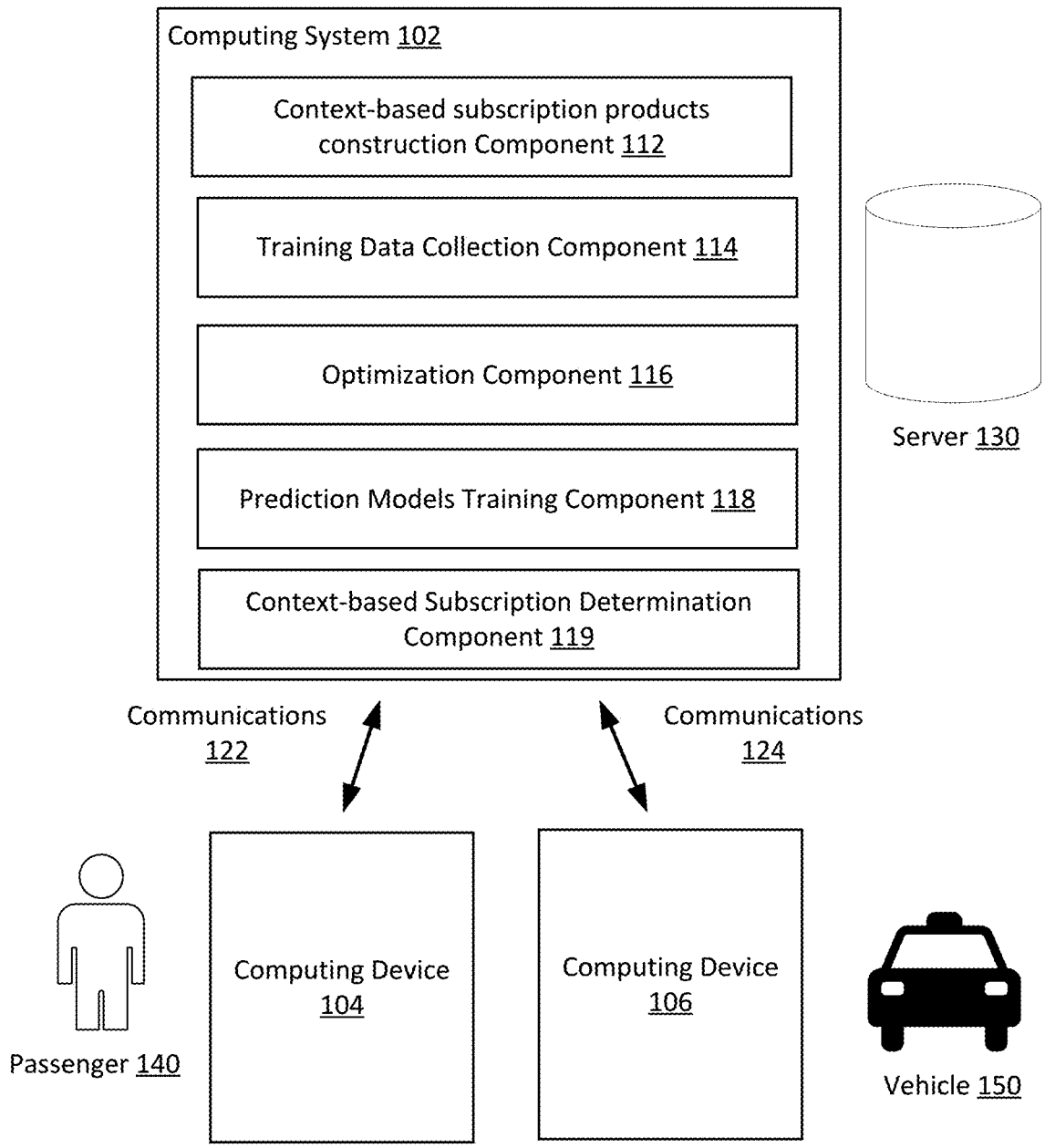
FIG. 1 illustrates an exemplary system to which determining a context-based subscription suite in a ride-hailing platform may be applied, in accordance with various embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

This specification provides various methods, systems, and storage mediums to extend subscription products for a ride-hailing platform to be context-based (e.g., may also be called context-aware). For example, a trip order requesting a ride may fall into a pre-defined transportation context (e.g., rainy day, from a residential area to commercial area), and may receive a discount if the rider has purchased a subscription product corresponding to the pre-defined context. This way, a user may be incentivized to purchase multiple subscription products (also called "subscription product suite" or "subscription suite") at a time.

In some embodiments, the specification also discloses methods and systems for joint model training and optimization for context-based subscription product suite in ride-hailing platforms. The disclosed methods and systems are configured to determine the optimal parameters of the subscription products, such as premium and other terms of the subscription products. For example, by leveraging the context-based diversity in user behaviors and other important attributes related to ridesharing, the disclosed embodiments provide a way to algorithmically design premiums, discounts and other terms for subscription products that users are willing to purchase, with an objective to maximize one or more key performance indicator (KPI) values that the subscription products may bring to the ridesharing platform.

In some embodiments, each subscription product may be defined by a parameter vector including a set of parameters. For example, the parameter vector may include a premium parameter (e.g., an amount that a rider need to pay upfront in order to receive the benefits from the subscription product), one or more parameters defining benefits of the subscription product, one or more parameters defining the limitations to gain the benefits (e.g., the expiration date of the subscription product), and one or more parameters defining the context constraints for the subscription product (e.g., conditions for the subscription product to be applicable). The benefits of the subscription product may include a discount (e.g., an amount or a percentage of reduction off the displayed price of an order, or an upfront discount for lump sum deposit) or another type of incentive reward. The limitations to receive the benefits (discounts) may include a period during which the purchaser may receive the benefits (e.g., a monthly pass, a weekly pass), a trip count limit (e.g., the benefits will apply to the trips up to a trip count limit), or other suitable limitations.

In some embodiments, the context constraints for the subscription product define a plurality of transportation contexts. They may include a spatial condition, a route condition, a temporal condition, a spatial-temporal condition, a route-temporal condition, a weather condition, a marketplace condition, another suitable condition, or any combination thereof. The spatial condition may define the origin region or destination region for a trip to receive the benefits of the subscription product, e.g., the subscription product may be applied to a trip from or to a certain commercial area. The route condition may define a specified route (a pair of origin region and destination region), and the trips with the specified route may receive the benefits of the subscription product, e.g., from home to work. The temporal condition may define a specified time range, and trips that occurred during this range may receive the benefits of the subscription product. The spatial-temporal condition may refer to any pair of a spatial condition and a temporal condition as described above. The route-temporal condition may refer to any pair of a route condition and a temporal condition as described above. The weather condition may refer to a following condition, e.g., rainy, stormy, temperature over 90 degrees Fahrenheit, and trips satisfying the weather condition may receive the benefits of the subscription product. The marketplace condition may refer to the current supply-demand condition of the market, e.g., when the surge multiplier is higher than a pre-defined threshold (which indicates "under-supply" imbalance), and trips occurring under the defined marketplace condition may receive the benefits of the subscription product.

FIG. 1 illustrates an exemplary system 100 to which determining a context-based subscription suite in a ride-hailing platform may be applied, in accordance with various embodiments. The exemplary system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network.

The computing devices 104 and 106 may be implemented on or as various devices such as a mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ride-hailing platform. The ride-hailing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ride-hailing platform.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, the computing device 104 may include a context-based subscription products construction component 112, a training data collection component 114, an optimization component 116, a prediction models training component 118, and a context-based subscription determination component 119.

In some embodiments, the context-based subscription products construction component 112 may be configured to construct a plurality of parameter vectors each representing a context-based subscription product, wherein each of the plurality of context-based subscription products corresponds to a transportation context, and when a transportation trip requested through a ride-hailing platform satisfies one of the plurality of transportation contexts, the corresponding context-based subscription sets a benefit to be applied to the transportation trip. Here, the "benefit" may include a discount, a reward, an incentive, or another form of benefit. Each of the plurality of context-based subscription products may be applicable to a transportation trip-requesting session between a rider and the ride-hailing platform when the trip-requesting session satisfies the conditions of the transportation context corresponding to the context-based subscription product. As described above, each of the transportation contexts may be defined by a set of context constraints (conditions) including a spatial condition, a route condition, a temporal condition, a spatial-temporal condition, a route-temporal condition, a weather condition, a marketplace condition, another suitable condition, or any combination thereof. For simplicity, the embodiments disclosed herein may assume the transportation contexts are already determined or may be directly obtained. It may be obvious for a person in the art to use other traditional clustering methods to determine the routes and time conditions, or to determine the "high surge" threshold by analyzing historical price surge data.

In some embodiments, the training data collection component 114 may be configured to obtain a plurality of historical trip-requesting sessions between a plurality of riders and the ride-hailing platform, and a plurality of historical context-based subscription products offered to the plurality of riders. Here, each of the historical trip-requesting sessions may include a rider's browsing event for a ride (e.g., including origin, destination, time, and other suitable information), the displayed information from the ride-hailing platform (e.g., ride options, route selection, prices for the ride options, and other suitable information displayed on the rider's smartphone), the rider's request for the ride (e.g., whether the rider decides to convert the browsing event to a trip), other suitable information, or any combination thereof. These historical trip-requesting sessions may be used by other components to train various machine learning models and evaluate the trained machine learning models.

In some embodiments, the optimization component 116 may be configured to learn at least one key performance indicator (KPI) model that predicts a KPI value for the ride-hailing platform, wherein the KPI value indicates a reward to the ride-hailing platform for offering the plurality of context-based subscription products to the plurality of riders of the plurality of historical trip-requesting sessions, and is predicted based at least on the plurality of parameter vectors; and construct an optimization model to maximize a weighted sum of the at least one KPI value generated by the at least one KPI model, wherein the optimization model comprises the plurality of parameter vectors of the plurality of context-based subscription products as decision variables.

In some embodiments, the KPI models may include a net income model, a gross merchandise value (GMV) model, a number of trips model, another suitable model, or any combination thereof. In some embodiments, the optimization model may be represented as formula (1) as below:

$$\max \Sigma_i w_i f_i(\theta_p, \theta_m, \theta_t, \theta_c, D) \quad (1)$$

where $f_i$ is the i-th KPI models to optimize, $w_i$ is the weight for i-th KPI models, $\theta_p = [\theta_{p,0}, \theta_{p,1}, \ldots, \theta_{p,S}]^T$ is the premium vector for S subscription products, $\theta_m$ is the discount multiplier vector for the S subscription products, $\theta_t$ is the vector of the time durations of the S subscription products (weekly, monthly, etc.), $\theta_c$ is the trip count limit vector for the S subscription products, and D is the session-level historical data (e.g., the plurality of historical trip-requesting sessions collected by the training data collection component 114) that represents the normal marketplace status. D may be used as the initial status for simulating the impact of the subscription products. For the convenience of notations, in some embodiments, a dummy subscription product may be included in the S subscription products to represent the case where no subscription is purchased. The parameters for the dummy subscription product may include: $\theta_{p,0} = 0$, $\theta_{m,0} = 1.0$; $\theta_{t,0} = +\infty$, $\theta_{c,0} = +\infty$, or some sufficiently large number.

In some embodiments, each model $f_i$ may be summable or non-summable. The value of a summable model $f_i$ may be directly calculated by summing up the $f_i$ value for each of the plurality of historical trip-requesting sessions in D. For example, the value of $f_i$ may be calculated by: accumulating a plurality of session-level rewards respectively corresponding to the plurality of context-based subscription products, wherein each of the plurality of session-level rewards is determined by: determining, by a first trained machine learning model, a first probability of a rider involved in a historical trip-requesting session subscribing one of the plurality of context-based subscription products; determining, by a second trained machine learning model, a second probability of the rider converting the historical trip-requesting session to a trip; determining an expected reward assuming the historical trip-requesting session is converted to the trip; and determining the session-level reward as a product of the first probability, the second probability, and the expected reward.

As an example, assuming that for a session, there is at most one subscription product applicable (if purchased), the i-th model $f_i$ may be calculated as formula (2):

$$f_i(\Theta, D) = \Sigma_s \Sigma_j [g_i(\hat{\theta}_{\eta(s,j)}, E_j) \cdot p_{conv}(\text{trip}|\hat{\theta}_{\eta(s,j)}, R_{u(j)}, B_j) \cdot p_{purchase}(s|\hat{\theta}_s, R_{u(j)})] \quad (2)$$

where subscript s represents the s-th subscription product, subscript j represents the row index of the data D, which corresponds to a historical trip-requesting session (the j-th trip-requesting session), u(j) refers to the user/rider corresponding to the trip-requesting session j (in historical data, a user might cover multiple sessions), $\Theta = [\theta_p, \theta_m, \theta_t, \theta_c]$ refers to a plurality of parameter vectors defining the plurality of subscription products (every element here is a column vector, thus $\Theta$ is a matrix; each row of $\Theta$ corresponds to one parameter vector defining one of the subscription products), $\hat{\theta}_s = [\theta_{p,s}, \theta_{m,s}, \theta_{t,s}, \theta_{c,s}]$ defines the parameter vector for subscription product s, $\eta(s,j) = s \cdot I_{\{s \in j\}}$, where $I_{\{\cdot\}}$ represents an indicator function, and $s \in j$ means subscription product s is available for the trip-requesting session j, $g_i(\cdot)$ is the same KPI model as $f_i$ but evaluated at per-session level (per trip-requesting session) with the assumption that the corresponding trip-requesting session has already converted to a trip, $E_j$ is a vector of variables that are related to unit economics (e.g., payment to the driver, charge to the riders, subsidy for drivers and riders, estimated distance of the trip, estimated time duration of the trip, number of passengers in the trip for carpool services), $B_j$ is a vector of session-level features that may impact a rider's decision of taking a ride or not, $R_u$ is a vector of rider features for the rider u that may impact a rider's decisions of purchasing a subscription product, $p_{conv}$ refers to the first trained machine learning model, and $p_{conv}(\text{trip}|\hat{\theta}_{\eta(s,j)}, R_{u(j)}, B_j)$ is the probability of a trip-requesting session being converted to a trip, $p_{purchase}$ refers to the second trained machine learning model and $p_{purchase}(s|\hat{\theta}_s, R_u)$ is the probability of a rider u purchasing the subscription product s. In some embodiments, a historical trip-requesting session may trigger one subscription product or none. For simplicity, the transportation contexts are defined as non-overlapping, and thus one historical trip-requesting session will not trigger more than one subscription product.

In some embodiments, the value of a non-summable model $f_i$ may not be directly calculated. For example, a model "profit rate" model defined as profit/GMV may be non-summable (as summing rates in this context do not make mathematical sense). Instead of directly calculating the value of a non-summable model $f_i$, the summable components may be calculated first using the methods as mentioned above (e.g., formula (2)), and then calculate the non-summable model by aggregating the values of the summable components. Still using the "profit rate" defined as profit/GMV as an example, the two summable models (profit and GMV) may be calculated first, then the "profit rate" may be determined by dividing the values of these two summable models.

In some embodiments, the optimization model may be solved to determine an optimal configuration for each of the plurality of parameter vectors, where the optimal configuration comprises an optimal premium and an optimal benefit of the context-based subscription product corresponding to the each parameter vector. For example, the optimization model illustrated in formula (1) may be solved by derivative-free algorithms, including grid search (e.g., an exhaustive searching through a manually specified subset of the hyperparameter space of the optimization model), greedy search (e.g., a heuristic method of searching to the locally optimal points in the hyperparameter space of the optimization model), Bayesian optimization (e.g., a sequential design strategy for global optimization of black-box functions that do not assume any functional forms), or another suitable algorithm.

In some embodiments, the prediction models training component 118 may be configured to train the conversion model and the purchase model in formula (2), where the conversion model predicts if a rider will book a trip given the information the rider observed from the app after the rider entered the origin and destination, and the purchase model predicts the probability of a rider purchasing each of the subscription products. In some embodiments, the conversion model and the purchase model may be jointly trained by: obtaining a plurality of historical trip-requesting sessions between a plurality of riders and a ride-hailing platform, wherein each of the historical trip-requesting sessions comprises a plurality of session-level features; obtaining a plurality of parameter vectors respectively corresponding to a plurality of context-based subscription products; feeding the plurality of historical trip-requesting sessions and the plurality of parameter vectors into a first machine learning model to generate a plurality of feature vectors corresponding to the plurality of historical trip-requesting sessions, wherein the plurality of feature vectors comprise a plurality of rider-level features of a rider in each of the plurality of historical trip-requesting sessions and a parameter vector of one of the plurality of context-based subscription products that is applicable to the historical trip-requesting session; feeding the plurality of feature vectors and the plurality of session-level features of the historical trip-requesting session to a second machine learning model to predict a plurality of first probabilities for the plurality of historical trip-requesting sessions being converted to trips; deduplicating the plurality of feature vectors by removing feature vectors with duplicate rider-and-subscription-product pairs to obtain a plurality of deduplicated records of features corresponding to the plurality of riders; feeding the plurality of deduplicated records of features to a third machine learning model to predict a plurality of second probabilities of the plurality of riders subscribing one or more of the plurality of subscription products; jointly training the first machine learning model, the second machine learning model, and the third machine learning model.

Based on the denotations in formula (2), the features considered by the conversion model may include the session-level features $B_j$, the rider-level features $R_u$, and the subscription product parameters $\Theta=[\theta_p, \theta_m, \theta_t, \theta_c]$. In some embodiments, the session-level features $B_j$ may include at least one of the following: a price displayed by the ride-hailing platform to the rider; a discount displayed by the ride-hailing platform to the rider; estimated time to arrive (ETA) for pick-up; estimated route distance to a destination; time; or origin and destination locations. In some embodiments, the rider-level features $R_u$ may include at least one of the following: an average price of historical trips; or the rider's subscription history. In some embodiments, the conversion model may be a classification model for a plurality of classes corresponding to multiple types of ridesharing services such as a carpool service, a solo service, or another suitable service. The conversion model may generate the probability of the predicted class, so that the probability may be used in the optimization formulation to weigh the different outcome scenarios. In some embodiments, the conversion model may be trained as logistic regression, a random forest, and neural networks.

Similarly, the purchase model may also be a classification model for multiple classes. The purchase model may generate the probability of the predicted class. However, the sum of the probabilities may not be required to be 1, as it is allowed for a user to purchase multiple subscription products. For example, assuming a neural network is trained as the purchase model, the output layer of the neural network may be able to generate a "multi-hot" encoded output, rather than a softmax form (i.e., one-hot encoded). It is because an arbitrary number of is may be allowed to appear in the final output (e.g., may be upper-bounded by the number of subscription products). In some embodiments, the purchase model may be trained as logistic regression, a random forest, and neural networks.

In some embodiments, the context-based subscription determination component 119 may be configured to determine a set of subscription products to offer to the riders. For example, the optimization model constructed by the optimization component 116 (comprising the prediction models trained by the prediction models training component 118) may be solved to obtain one or more optimal parameter vectors representing one or more optimal subscription products. These optimal subscription products may theoretically generate a maximized KPI value for the ride-hailing platform. The "maximized" KPI value in this context refers to the optimal KPI value calculated based on one or more KPI metrics (may be also referred to as KPI models). In some embodiments, if a smaller value of a KPI metric is preferred (e.g., the ride-hailing platform may prefer a shorter value for the KPI metric "average waiting time for pickup"), the KPI metric may be transformed to its negative value or inverse value so that the objective is still to "maximize" the KPI value.

In some embodiments, the optimal subscription products may be ranked for each rider. For example, the ranking may be based on the rider's historical travel frequency or the rider's historical spending during the specified time blocks. As another example, the trained purchase model may provide the probability of how likely a rider will purchase each of the subscription products, which may be used to rank the subscription products for the rider.

Figure 2:
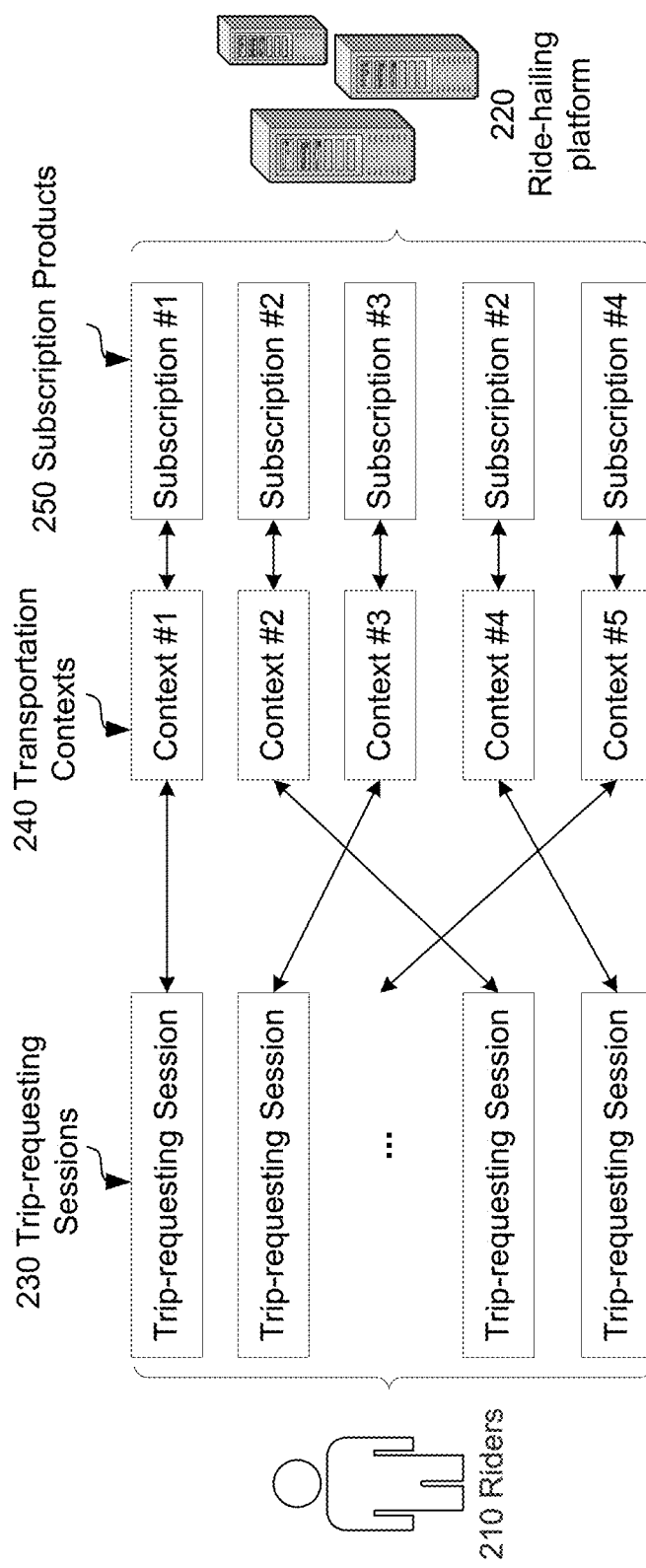
FIG. 2 illustrates a diagram of context-based subscription products in a ride-hailing platform in accordance with various embodiments.

FIG. 2 illustrates a diagram of context-based subscription products in a ride-hailing platform in accordance with various embodiments. As shown, a ride-hailing platform 220 may provide a plurality of subscription products 250 for the riders 210. These subscription products 250 may be context-based or context-aware, meaning one subscription product 250 may be specifically designed for (e.g., applicable to) one of the transportation contexts 240. The transportation contexts 240 may be predetermined by the ride-hailing platform 220 in various ways. For example, each transportation context may include one or more conditions, and when a trip-requesting session between a rider and the ride-hailing platform satisfies the one or more conditions of one of the plurality of transportation contexts, the trip-requesting session may belong to the transportation context and receive a discount according to one of the plurality of context-based subscription products that is applicable to the one transportation context. In some embodiments, the one or more conditions of each transportation context comprise at least one of the following: a spatial condition defining an origin region or a destination region; a route condition defining a pair of origin region and destination region; a temporal condition defining a time range; a spatial-temporal condition comprising any pair of the spatial condition and the temporal condition; a route-temporal condition comprising any pair of the route condition and the temporal condition; a weather condition; and a marketplace condition. Each transportation context 240 may be mapped to one subscription product 250, and one subscription product 250 may be mapped to one or more transportation context 240.

When a rider 210 makes a ride request to the ride-hailing platform 220 through smartphones or web portals, the rider 210 starts a trip-requesting session 230 with the ride-hailing platform 220. The trip-requesting session 230 may be associated with a plurality of session-level features including the rider's 210 order details, the ride-hailing platform's 220 proposed trip information (e.g., the information displayed to the rider through the rider's smartphone), the rider's 210 response to the ride-hailing platform's 220 proposed trip information, other suitable information, or any combination thereof. For example, the rider's 210 order tails may include a pick-up location, a destination, a current time, a trip type (carpool, solo, etc.), a payment method, an applicable coupon, other suitable information, or any combination thereof. The ride-hailing platform's 220 proposed trip information may include ride options, displayed prices, displayed discount on the prices, surge multipliers, estimated time to arrival (ETA) for pick-up, estimated distance to arrive for pick-up, estimated time to destination (ETD), estimated route distance to the destination, offered subscription products, other suitable information, or any combination thereof.

The rider's 210 response to the ride-hailing platform's 220 proposed trip information may include whether the request is converted to an actual trip, whether the rider 210 abandoned the request, whether the rider 210 purchased one or more of the offered subscription products, other suitable information, or any combination thereof.

Based on the session-level features, a given trip-requesting session 230 may be classified into one of the predetermined transportation contexts 240. Each of the transportation contexts 240 may be defined by a plurality of conditions, such as a spatial condition, a route condition, a temporal condition, a spatial-temporal condition, a route-temporal condition, a weather condition, a marketplace condition, another suitable condition, or any combination thereof. The spatial condition may define the origin region or the destination region for a trip-requesting session to receive the benefits of the subscription product, e.g., the subscription product may be applied to a trip-requesting session requesting a trip from or to a certain commercial area. The route condition may define a specified route (a pair of origin region and destination region) and the trip-requesting session requesting the specified route may receive the benefits of the subscription product, e.g., from home to work. The temporal condition may define a specified time range, and a trip-requesting session occurred during this range may receive the benefits of the subscription product. The spatial-temporal condition may refer to any pair of a spatial condition and a temporal condition as described above. The route-temporal condition may refer to any pair of a route condition and a temporal condition as described above. The weather condition may refer to a following condition, e.g., rainy, stormy, temperature over 90 degrees Fahrenheit, and a trip-requesting session satisfying the weather condition may receive the benefits of the subscription product. The marketplace condition may refer to the current supply-demand condition of the market, e.g., the surge multiplier is above a pre-defined threshold (which means "under-supply"), and a trip-requesting session occurred under the defined marketplace condition may receive the benefits of the subscription product.

A trip-requesting session 230 with session-level features satisfying the conditions of a transportation context 240 may be mapped to a subscription product 250 corresponding to the transportation context 240. For example, in FIG. 2, if a trip-requesting session 230 satisfies transportation context #1, subscription #1 may be applicable to the trip-requesting session. In practice, a rider may make multiple ride requests during a short period of time that are categorized into different transportation contexts, and thus different subscription products may be applicable. For example, a rider may book a first trip from home to work in the morning that may satisfy a transportation context defined by a route-temporal condition. The rider may then book a second trip to the airport during the rush hour that may satisfy a transportation context defined by a marketplace condition. Subsequently, the rider may book a third trip to a hotel during rainy weather that may satisfy a transportation context defined by a weather condition. In this case, the rider may have incentives to purchase various subscription products to cover his or her trips under different transportation contexts and maximize the savings.

Figure 3:
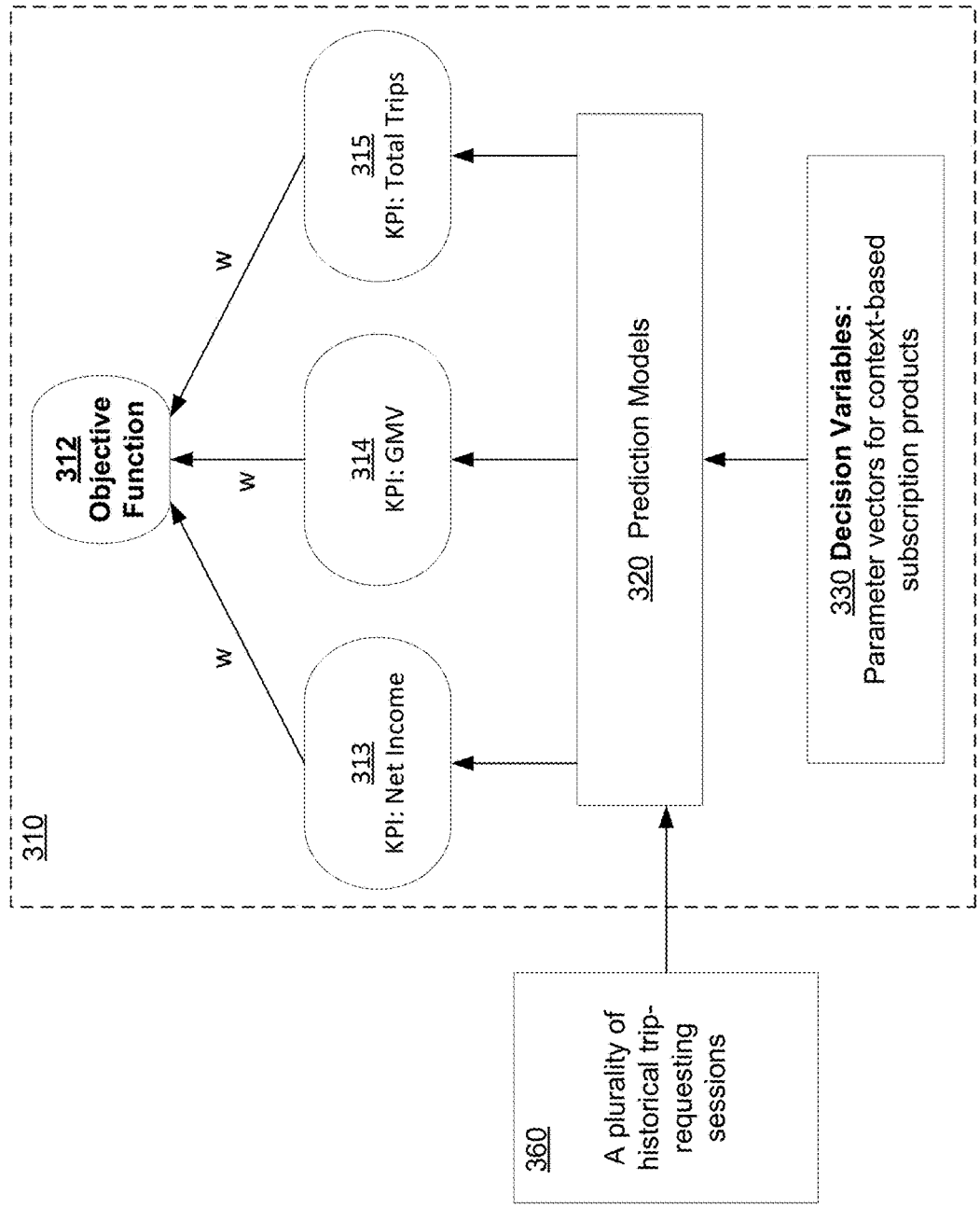
FIG. 3 illustrates an exemplary diagram of an optimization model for determining a context-based subscription suite in a ride-hailing platform in accordance with various embodiments.

FIG. 3 illustrates an exemplary diagram of an optimization model 310 for determining a context-based subscription suite in a ride-hailing platform in accordance with various embodiments. In some embodiments, the optimization model 310 may be constructed by: constructing, based on the plurality of historical trip-requesting sessions and the plurality of historical subscription products, at least one key performance indicator (KPI) model that predicts a reward for the ride-hailing platform offering the plurality of context-based subscription products to the plurality of riders, wherein the reward is predicted based at least on a plurality of parameter vectors representing the plurality of context-based subscription products, a plurality of rider-level features of each of the plurality of riders, and a plurality of session-level features of each of the plurality of historical trip-requesting sessions; constructing an optimization model to maximize a weighted sum of the at least one KPI model, wherein the optimization model comprises the plurality of parameter vectors of the plurality of context-based subscription products as decision variables.

For example, the optimization model 310 comprises an objective function 312, one or more KPI models 313-315, one or more prediction models 320 that are used in the KPI models 313-315, and a plurality of decision variables 330. The objective function 312 of the optimization model 310 may be a weighted sum of the KPI models 313-315. An exemplary objective function is illustrated in formula (1). In some embodiments, the KPI models may include a net income model, a GMV model, a number of trips model, another suitable model, or any combination thereof. The ride-hailing platform may determine the models to be considered and the weights of the models based on its business interest.

Figure 4:
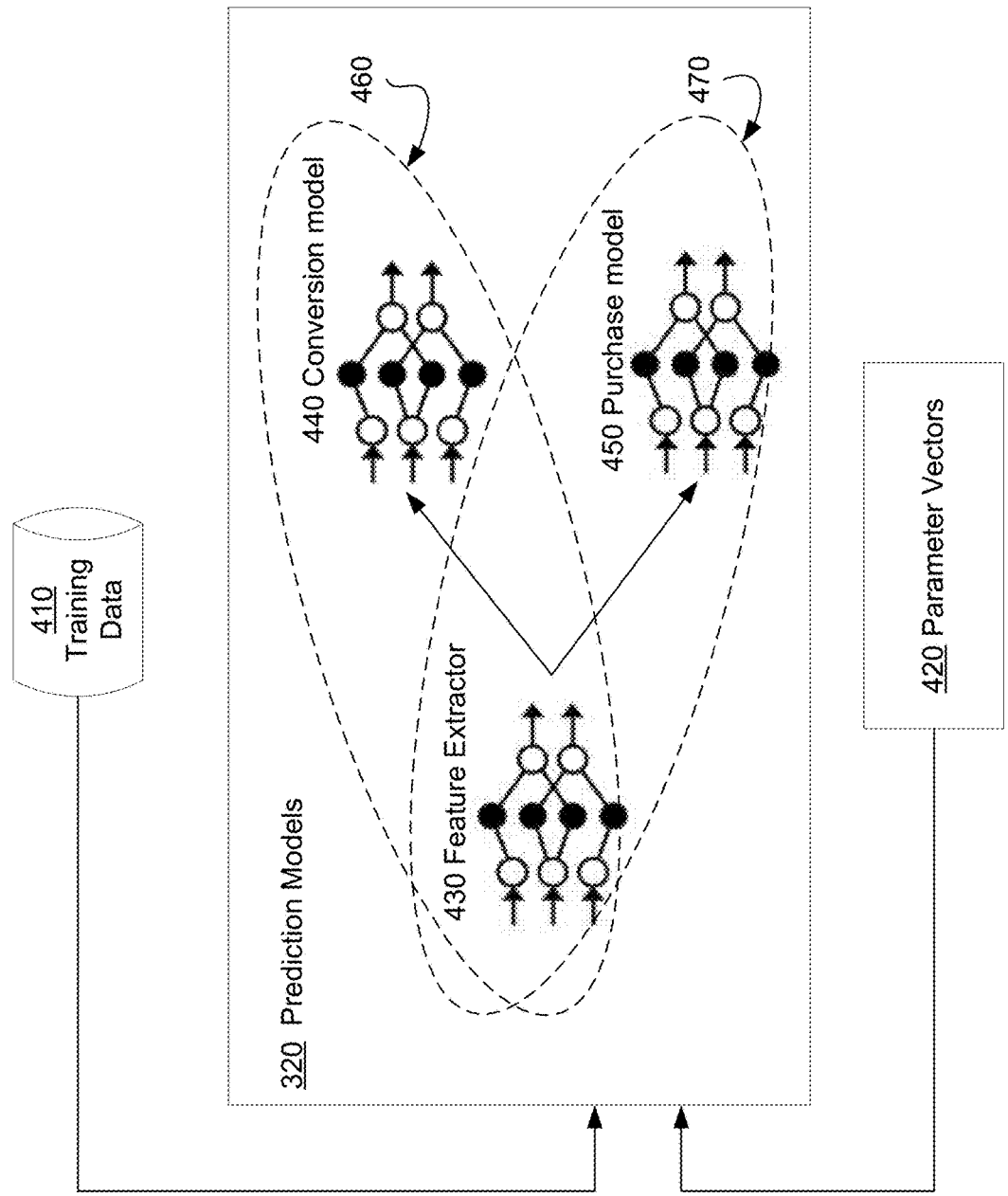
FIG. 4 illustrates an exemplary diagram for training prediction models to determine optimal context-based subscription products in a ride-hailing platform in accordance with various embodiments.

In some embodiments, the KPI models 313-315 may be substantiated by one or more prediction models 320 to predict probabilities that certain actions would occur. These actions may directly result in rewards for the ride-hailing platform. In some embodiments, the prediction models 320 may include a conversion model and a purchase model. As an example, the conversion model and the purchase model may correspond to the $p_{conv}$ and $p_{purchase}$ in formula (2), respectively. In some embodiments, the conversion model predicts if a rider will book a trip given the information the rider observed from the app after the rider entered the origin and destination. The purchase model predicts the probability of a rider purchasing each of the subscription products. In some embodiments, the conversion model and the purchase model may be individually or jointly trained. An exemplary training process of the conversion model and the purchase model is illustrated in FIG. 4.

In some embodiments, the decision variables 330 of the optimization model 310 may be used to determine the optimal configurations for the context-based subscription products. Each subscription product may be defined by a set of parameters (also called a parameter vector), such as a premium to purchase the product, a discount (as an amount or a percentage) to be applied to trips, a valid period of the product (e.g., a week, a month), and a trip count limit (e.g., the product can only be applied to a certain amount of trips). In other embodiments, the configurations may have other parameters such as a limit of the total discounts, which may be designed according to the implementation details. In some embodiments, the decision variables 330 may be part of the objective function 312 (as shown in formula (1)). When the objective function 312 is solved, the values of the decision variables 330 may be determined. Referring to the formula (1), the $\{\theta_p, \theta_m, \theta_t, \theta_c\}$ may refer to a matrix comprising a plurality of rows, each row including a parameter vector that defines a subscription product. Assuming the ride-hailing platform determines that there are S transportation contexts, the matrix $\{\theta_p, \theta_m, \theta_t, \theta_c\}$ may include S rows. By solving the optimization function 312, a maximum KPI value may be obtained by the determined values of the $\{\theta_p, \theta_m, \theta_t, \theta_c\}$. These determined values may define the S subscription products that the ride-hailing platform can offer to the riders.

In some embodiments, the optimization model 310 may be evaluated based on a plurality of historical communication sessions 360. The historical communication sessions 360 may be treated as a reflection of current market status, which provides a simulated environment to evaluate the subscription products, e.g., the parameter D in formula (1) may provide a simulated market place to determine how the $\{\theta_p, \theta_m, \theta_t, \theta_c\}$ in formula (1) may affect the weighted sum of the $f_i$. For example, the historical communication sessions 360 may include a plurality of historical trip-requesting sessions between a plurality of riders and the ride-hailing platform, a plurality of historical subscription products offered to the plurality of riders, other suitable information, or any combination thereof.

In some embodiments, among the parameter vectors $\{\theta_p, \theta_m, \theta_t, \theta_c\}$ defining the subscription products, the discrete variable $\theta_c$ may be relaxed to real values. In some embodiments, the KPI models, e.g., $f_i$ in formula (1) and $g_i$ in formula (2), may not be differentiable as they may include various cut-offs and thresholds. Thus, numerical approaches may be used to approximate the gradients. That is, gradient-based or derivative-free optimization algorithms may be used to solve the optimization model 310, including grid search, greedy search, Bayesian optimization, or another suitable algorithm. By solving the optimization model, the optimal values of the plurality of parameter vectors $\{\theta_p, \theta_m, \theta_t, \theta_c\}$ corresponding to the plurality of context-based subscription products may be determined. Based on the optimal values of $\{\theta_p, \theta_m, \theta_t, \theta_c\}$ the optimal context-based subscription products may be determined.

In some embodiments, the optimal context-based subscription products may be sent to riders for purchasing. In order to avoid unnecessary disruption or confusion, the ride-hailing platform may selectively send some of the optimal context-based subscription products to a given rider based on the rider's features and conditions. For example, a given rider's historical trips may be analyzed to determine one or more transportation contexts that the rider may be frequently use. Spatial and temporal features of the rider's historical trips may be extracted and compared against the conditions of each of the transportation context, such as, the rider took trips between home and work frequently, the rider took trips during rainy days frequently, and the rider visited a specific shopping mall frequently. Then the ride-hailing platform may recommend the optimal context-based subscription products corresponding to the one or more transportation contexts to the rider for purchasing. In some embodiments, a rider's foreseeable status change may be considered in recommending optimal context-based subscription products. For example, if the rider's trip to another location is observed, the ride-hailing platform may recommend optimal context-based subscription products that are suitable for the riders in that location (e.g., if the location is Seattle during a rainy season, the optimal context-based subscription products may include one that provides discount to ordering rides in rainy days).

FIG. 4 illustrates an exemplary diagram for training prediction models 320 to determine optimal context-based subscription products in a ride-hailing platform in accordance with various embodiments. These trained prediction models 320 may be used as parts of the optimization model 310 shown in FIG. 3 to make predictions of various probabilities according to input parameters such as subscription product parameter vectors, rider-level features, session-level features, other suitable inputs, or any combination thereof.

As described above, these prediction models may include a conversion model 440 and a purchase model 450. In some embodiments, the conversion model predicts if a rider will book a trip given the information the rider observed from the app after the rider entered the origin and destination. The purchase model predicts the probability of a rider purchasing (e.g., subscribing) each of the subscription products. In some embodiments, the prediction models 320 may further include a feature extractor 430 that transforms (e.g., by extracting, selecting, padding, or otherwise converting) the input data into a desired set of features to feed into the conversion model 440 and the purchase model 450. In some embodiments, the feature extractor 430, the conversion model 440, and the purchase model 450 may be individually or jointly trained.

In some embodiments, the training process for the feature extractor 430, the conversion model 440, and the purchase model 450 may be implemented by: feeding the plurality of sets of rider-level features in the training data and a plurality of parameter vectors respectively corresponding to a plurality of context-based subscription products to a first machine learning model (the feature extractor 430) to generate a plurality of feature vectors corresponding to the plurality of historical trip-requesting sessions; feeding the plurality of feature vectors and the plurality of sets of session-level features to a second machine learning model (the conversion model 440) to predict a plurality of first probabilities for the plurality of historical trip-requesting sessions being converted to trips; deduplicating the plurality of feature vectors by removing vectors with duplicate rider-and-subscription-product pairs to obtain a plurality of deduplicated records of features corresponding to the plurality of riders; feeding the plurality of deduplicated records of features to a third machine learning model (the purchase model 450) to predict a plurality of second probabilities of the plurality of riders subscribing one or more of the plurality of subscription products; jointly training the first machine learning model, the second machine learning model, and the third machine learning model.

In some embodiments, the training data 410 for training the prediction models may include a plurality of historical trip-requesting sessions between a plurality of riders and a ride-hailing platform, and a plurality of historical context-based subscription products offered to the plurality of riders, wherein the plurality of historical context-based subscription products respectively correspond to a plurality of transportation contexts, and when a trip requested by a trip-requesting session satisfies one of the plurality of transportation contexts, the corresponding context-based subscription applies a discount to the trip. This training data 410 may refer to (part of) the historical communication sessions 360 in FIG. 3. In some embodiments, the training data 410 may be represented as a sample matrix, with each row corresponding to a trip-requesting session (each sample) between a rider and the ride-hailing platform. In some embodiments (also shown in FIG. 4), the training data 410 may be fed into the feature extractor 430, the conversion model 440, and the purchase model 450 along with parameter vectors 420 that define a plurality of subscription products (also called a subscription suite). The prediction models 320 may include a plurality of machine learning models to extract features from the input data, and predict probabilities of a trip-requesting session converting to a trip and probabilities of a rider purchasing a subscription product, etc. In some embodiments, the predictions generated by the feature extractor 430, the conversion model 440, and the purchase model 450 may be compared with the training data (e.g., some of the training data 410 may be labeled manually or automatically) to obtain rewards, which may be used to adjust the parameters of the prediction models 320 so that the predictions may more closely approximate the environment represented by the training data 410.

In some embodiments, the training process may include: feeding the plurality of historical trip-requesting sessions into a first machine learning model to generate a plurality of feature vectors respectively corresponding to the plurality of historical trip-requesting sessions; feeding the plurality of feature vectors to a second machine learning model to predict a plurality of first probabilities for the plurality of historical trip-requesting sessions being converted to trips; deduplicating the plurality of feature vectors by keeping one of multiple feature vectors corresponding to a same rider and a same subscription product to obtain a plurality of deduplicated feature vectors respectively corresponding to the plurality of riders; feeding the plurality of deduplicated feature vectors to a third machine learning model to predict a plurality of second probabilities of the plurality of riders subscribing one or more of the plurality of subscription products; jointly training the first machine learning model, the second machine learning model, and the third machine learning model based on the plurality of first probabilities, the plurality of second probabilities, and the plurality of historical trip-requesting sessions.

For example, the training data 410 and the parameter vectors 420 may be fed into a first machine learning model to generate a plurality of feature vectors corresponding to the plurality of historical trip-requesting sessions in the training data 410, wherein the plurality of feature vectors comprise a plurality of rider-level features of a rider in each of the plurality of historical trip-requesting sessions and a parameter vector of one of the plurality of context-based subscription products that is applicable to the historical trip-requesting session.

The first machine learning model may refer to a feature extractor 430 $NN_{feat}$ (e.g., a neural network) that extracts features. Assuming the sample matrix is denoted as X, thus a j-th row in X corresponding to the j-th trip-requesting session. The $NN_{feat}$ may generate features $[\theta_{p,\hat{s}(j)}, \theta_{m,\hat{s}(j)}, \theta_{t,\hat{s}(j)}, \theta_{c,\hat{s}(j)}, R_{u(j)}]$ from the j-th trip-requesting session, where $\hat{s}(j)$ is defined as the subscription product s that is applicable at session j (if none is available, $\hat{s}(j)=0$), thus $[\theta_{p,\hat{s}(j)}, \theta_{m,\hat{s}(j)}, \theta_{t,\hat{s}(j)}, \theta_{c,\hat{s}(j)}]$ refers to the parameter vector of the applicable subscription product, and $R_{u(j)}$ refers to the rider-level features of the rider involved in the j-th trip-requesting session.

In some embodiments, the rider-level features of a rider may include rider's historical subscription purchase record, summary statistics of the rider's booking behaviors without a subscription, other suitable features, or any combination thereof. The rider's historical subscription purchase record may include the subscription product parameters (premium, discount, time duration, trip count limits) and/or the context constraint itself, the number of times the rider has been purchasing the subscription product. The summary statistics of the rider's booking behaviors without a subscription may include variables such as the number of trips, price of the trips, surge of the trips. The statistics may be mean or standard deviation, and the summary level (aggregation level) may be hourly, daily, day of the week, etc. In some embodiments, the average price of historical trips may be an essential feature as it plays a vital role in determining if the discount the rider gets from a subscription will be larger than the premium the rider paid to get the subscription. In some embodiments, other features may also be considered, such as the number of years the rider has been using the service provided by the ride-hailing platform, the most frequent payment method the rider used, the rider's phone information (manufacturer, operating system, etc.)

After sample matrix X is input into the $NN_{feat}$, a feature matrix $X'=NN_{feat}(X)$ may be obtained, where the feature matrix X' includes a plurality of feature vectors. In some embodiments, the plurality of feature vectors and the plurality of sets of session-level features may be fed into a second machine learning model to predict a plurality of first probabilities for the plurality of historical trip-requesting sessions being converted to trips.

Here, the second machine learning model may refer to the conversion model 440. For each trip requesting session j, $p_{conv}(trip|\hat{\theta}_{\hat{s}(j)}, R_{u(j)}, B_j)=[NN_{conv}([X', B])]_j$, where $NN_{conv}$ is the neural network model to make use of the feature vectors in X' and generate the final conversion probabilities (a binary choice).

In some embodiments, the feature vectors in the feature matrix X' may be respectively corresponding to a plurality of trip-requesting sessions, where multiple trip-requesting sessions may involve the same rider and the same subscription product (called a rider-and-subscription-product pair). For example, a rider books several trips within a day to which the same subscription product is applicable). In some embodiments, in order to train the purchase model 450 that predicts the probability of an individual rider purchasing each of the subscription products, the feature vectors in the feature matrix X' may go through a deduplication process to remove the feature vectors with duplicate rider-and-subscription-product pairs to obtain a plurality of deduplicated records of features, so that each of the plurality of deduplicated records of features corresponds to one individual rider.

In some embodiments, a hash table may be used to perform the deduplication. The hash table may record rider-and-subscription-product pairs in the form of (u, s) tuples. An incoming (u, s) tuple that has a conflict in the hash table may be ignored. This deduplication process may be denoted as X''=dedup_rows(X'), and the probability of a rider u purchasing a subscription product s may be denoted as:

$$p_{purchase}(s|\hat{\theta}_s, R_u)=[NN_{purchase}(X'')]_u, \forall s,u$$

where $NN_{purchase}$ may refer to the purchase mode 450 (a neural network).

The feature extractor 430, the conversion model 440, and the purchase model 450 may be jointly trained. In some embodiments, three models may be trained at the same time (e.g., parameters of the three models are adjusted at the same time). In some embodiments, the purchase model 450 $NN_{purchase}$ and feature extractor 430 $NN_{feat}$ may be trained together first (460 in FIG. 4), and then the parameters of $NN_{feat}$ may be fixed to train the conversion model 440 $NN_{conv}$. In some embodiments, the conversion model 440 $NN_{conv}$ and feature extractor 430 $NN_{feat}$ may be trained together first (470 in FIG. 4), and then the parameters of $NN_{feat}$ may be fixed to train the purchase model 450 $NN_{purchase}$.

In some embodiments, the aforementioned prediction models include the feature extractor 430, the conversion model 440, and the purchase model 450 may be implemented with various neural network structures, such as Multi-Layer Perceptrons (MLP) and Restricted Boltzmann Machines (RBM). In some embodiments, these prediction models may be used to construct the optimization model 310 described in FIG. 3 by constructing one or more key performance indicator (KPI)s models based on the trained second machine learning model and the trained third machine learning model, and constructing the optimization model with an objective function comprising a weighted sum of the KPI models and with the plurality of parameter vectors as decision variables.

FIG. 5 illustrates an exemplary method 500 for determining a context-based subscription suite in a ride-hailing platform in accordance with various embodiments. The method 500 may be performed by a device, apparatus, or system illustrated by FIGS. 1-4. The method 500 is merely illustrative. Depending on the implementation, the method 500 may have more, fewer, or alternative steps or components. The method 500 may be implemented by the computing system 102 in FIG. 1.

Block 510 includes constructing a plurality of parameter vectors each representing a context-based subscription product, wherein each of the plurality of context-based subscription products corresponds to a transportation context, and when a transportation trip requested through a ride-hailing platform satisfies one of the plurality of transportation contexts, the corresponding context-based subscription sets a benefit to be applied to the transportation trip.

Block 520 includes obtaining a plurality of historical trip-requesting sessions between a plurality of riders and the ride-hailing platform, and a plurality of historical context-based subscription products offered to the plurality of riders. In some embodiments, each of the plurality of transportation contexts comprises one or more conditions, and the trip satisfies the transportation context when the trip satisfies the one or more conditions of the transportation context, and the one or more conditions comprises at least one of the following: a spatial condition defining an origin region or a destination region; a route condition defining a pair of origin region and destination region; a temporal condition defining a time range; a spatial-temporal condition comprising any pair of the spatial condition and the temporal condition; a route-temporal condition comprising any pair of the route condition and the temporal condition; a weather condition; and a marketplace condition.

Block 530 includes training, based on the plurality of historical trip-requesting sessions and the plurality of context-based historical subscription products, at least one key performance indicator (KPI) model that predicts a KPI value for the ride-hailing platform, wherein the KPI value indicates a reward to the ride-hailing platform for offering the plurality of context-based subscription products to the plurality of riders of the plurality of historical trip-requesting sessions, and is predicted based at least on the plurality of parameter vectors.

In some embodiments, the KPI value to the ride-hailing platform for offering the plurality of context-based subscription products to the plurality of riders is determined by accumulating a plurality of session-level rewards respectively corresponding to the plurality of context-based subscription products; and each of the plurality of session-level rewards is determined by: determining, from an output of a first trained machine learning model, a first probability of a rider involved in a historical trip-requesting session subscribing to one of the plurality of context-based subscription products; determining, from an output of a second trained machine learning model, a second probability of the rider converting the historical trip-requesting session to a trip; determining an expected reward based on an assumption that the historical trip-requesting session is converted to the trip; and determining the session-level reward as a product of the first probability, the second probability, and the expected reward.

In some embodiments, the first probability is determined based at least on the plurality of rider-level features of the rider and the parameter vector of the context-based subscription product. In some embodiments, the historical trip-requesting session satisfies one of the plurality of transportation contexts, and the second probability is determined based at least on the plurality of session-level features of the historical trip-requesting session, the plurality of rider-level features of the rider, and the parameter vector of the context-based subscription product corresponding to the one transportation context.

In some embodiments, the plurality of session-level features comprise at least one of the following: a price displayed by the ride-hailing platform to the rider. In some embodiments, a discount displayed by the ride-hailing platform to the rider; estimated time to arrive (ETA) for pick-up; estimated route distance to a destination; time; or origin and destination locations. the rider-level features comprise at least one of the following: an average price of historical trips; or the rider's subscription history.

Block 540 includes constructing an optimization model to maximize a weighted sum of the at least one KPI value generated by the at least one KPI model, wherein the optimization model comprises the plurality of parameter vectors as decision variables.

Block 550 includes determining, by the computing device solving the optimization model, an optimal configuration for each of the plurality of parameter vectors, wherein the optimal configuration comprises an optimal premium and an optimal benefit of the context-based subscription product corresponding to the each parameter vector.

In some embodiments, the method 500 may further comprise for a given rider, determining, by the computing device based on the given rider's historical trips, one or more of the plurality of transportation contexts that the given rider's historical trips satisfy; and sending, by the computing device, one or more of the plurality of context-based subscription products corresponding to the one or more determined transportation contexts to a computing device of the given rider for purchasing, wherein the one or more of the plurality of context-based subscription products are configured based on the corresponding optimal values.

FIG. 6 illustrates another exemplary method 600 for determining a context-based subscription suite in a ride-hailing platform in accordance with various embodiments. The method 600 may be implemented in an environment shown in FIG. 1. The method 600 may be performed by a device, apparatus, or system illustrated by FIGS. 1-5, such as the system 102 in FIG. 1. Depending on the implementation, the method 600 may include additional, fewer, or alternative steps performed in various orders or in parallel.

Block 610 includes obtaining a plurality of historical trip-requesting sessions between a plurality of riders and a ride-hailing platform, and a plurality of historical context-based subscription products offered to the plurality of riders, wherein the plurality of historical context-based subscription products respectively correspond to a plurality of transportation contexts, and when a trip requested by a trip-requesting session satisfies one of the plurality of transportation contexts, the corresponding context-based subscription applies a benefit to the trip.

Block 620 includes feeding the plurality of historical trip-requesting sessions and the plurality of historical context-based subscription products into a first machine learning model to generate a plurality of feature vectors respectively corresponding to the plurality of historical trip-requesting sessions.

Block 630 includes feeding the plurality of feature vectors to a second machine learning model to predict a plurality of first probabilities for the plurality of historical trip-requesting sessions being converted to trips. In some embodiments, the feeding the plurality of feature vectors to a second machine learning model comprises: for each of the plurality of historical trip-requesting sessions, feeding the corresponding feature vector and a plurality of session-level features of the historical trip-requesting session to the second machine learning model, wherein the plurality of session-level features comprises at least one of the following: a price displayed by the ride-hailing platform to a rider; a discount displayed by the ride-hailing platform to the rider; estimated time to arrive (ETA) for pick-up; estimated route distance to destination; time; or origin and destination locations. In some embodiments, each of the plurality of feature vectors comprises a set of rider-level features of the corresponding historical trip-requesting session and a parameter vector representing a context-based subscription product that provides a discount to the corresponding historical trip-requesting session. In some embodiments, the plurality of rider-level features of the rider comprises at least one of the following: an average price of the rider's historical trips; or the rider's subscription history.

Block 640 includes deduplicating the plurality of feature vectors by keeping one of multiple feature vectors corresponding to a same rider and a same subscription product to obtain a plurality of deduplicated feature vectors respectively corresponding to the plurality of riders. In some embodiments, the deduplicating the plurality of feature vectors comprises: generating a hash key based on the rider-and-subscription-product pair in each of the plurality of feature vectors; checking whether a hash table comprises the hash key; in response to the hash table not comprising the hash key, storing the feature vector in the hash table indexed by the hash key; and in response to the hash table comprising the hash key, skipping the feature vector.

Block 650 includes feeding the plurality of deduplicated feature vectors to a third machine learning model to predict a plurality of second probabilities of the plurality of riders subscribing one or more of the plurality of subscription products.

Block 650 includes jointly training the first machine learning model, the second machine learning model, and the third machine learning model based on the plurality of first probabilities, the plurality of second probabilities, and the plurality of historical trip-requesting sessions. In some embodiments, the jointly training the first machine learning model, the second machine learning model, and the third machine learning model comprises: training the first machine learning model and the second machine learning model together; and training the third machine learning model based on the trained first machine learning model. In some embodiments, the jointly training the first machine learning model, the second machine learning model, and the third machine learning model comprises: training the first machine learning model and the third machine learning model together; and training the second machine learning model based on the trained first machine learning model.

Block 650 includes constructing an optimization model based on the trained first machine learning model, the trained second machine learning model, and the trained third machine learning model to search for optimal values of a plurality of parameter vectors representing a plurality of optimal subscription products. In some embodiments, the constructing one or more key performance indicator (KPI)s models based on the trained second machine learning model and the trained third machine learning model; and constructing the optimization model with an objective function comprising a weighted sum of the KPI models and with the plurality of parameter vectors as decision variables. In some embodiments, each of the plurality of parameter vectors defines one of the plurality of subscription products and comprises at least one of the following values: a premium of the one subscription product; a discount amount or percentage of the one subscription product; a period of validity of the one subscription product; or a trip count limit of the one subscription product. In some embodiments, the KPI models comprise at least one of the following: a net income, a gross merchandise value (GMV), or a number of trips.

In some embodiments, each of the first machine learning model, the second machine learning model, and the third machine learning model comprises: a Multi-layer Perceptrons (MLP) neural network; or a Restricted Boltzmann Machines (RBM) neural network.

Figure 7:
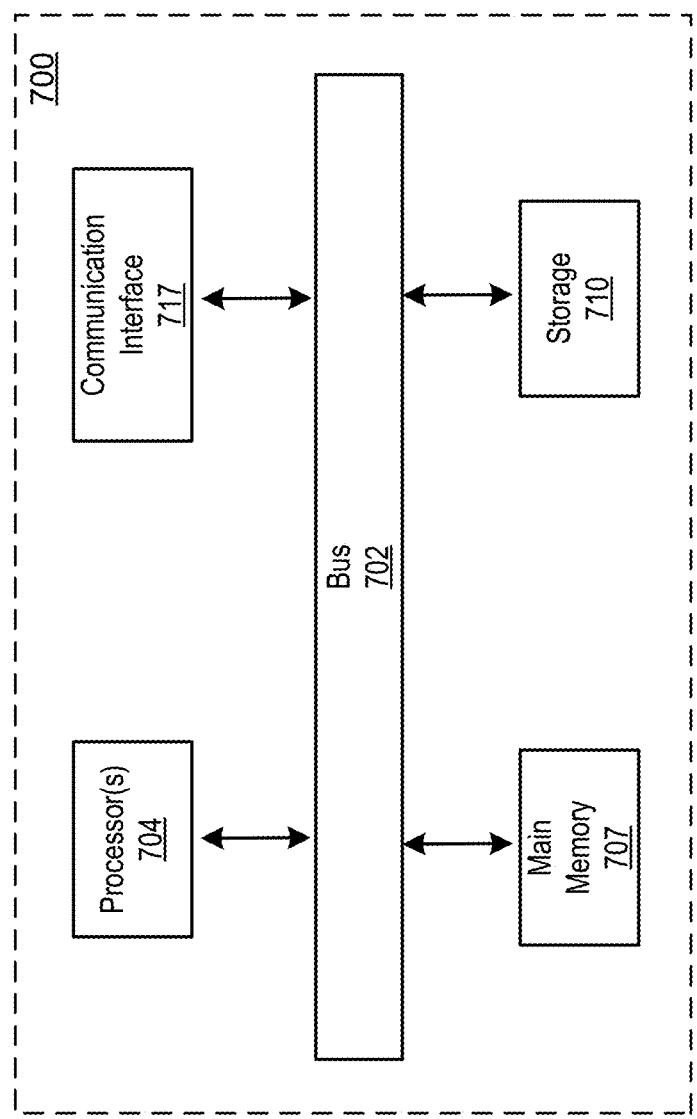
FIG. 7 illustrates an example computing device in which any of the embodiments described herein may be implemented.

FIG. 7 illustrates an example computing device in which any of the embodiments described herein may be implemented. The computing device may be used to implement one or more components of the systems and the methods shown in FIGS. 1-7. The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices 710, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 710. Execution of the sequences of instructions contained in main memory 707 may cause processor(s) 704 to perform the process steps described herein. For example, the processes/ methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 717 coupled to bus 702. Communication interface 717 may provide a two-way data communication coupling to one or more network links that are connected to one or more networks. As another example, communication interface 717 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computer-implemented method comprising:

obtaining a plurality of historical trip-requesting sessions between a plurality of riders and a ride-hailing platform, and a plurality of historical context-based subscription products offered to the plurality of riders, wherein the plurality of historical context-based subscription products respectively correspond to a plurality of transportation contexts, and when a trip requested by a trip-requesting session satisfies one of the plurality of transportation contexts, the corresponding context-based subscription applies a benefit to the trip;

feeding the plurality of historical trip-requesting sessions and the plurality of historical context-based subscription products into a first machine learning model to generate a plurality of feature vectors respectively corresponding to the plurality of historical trip-requesting sessions;

feeding the plurality of feature vectors to a second machine learning model to predict a plurality of first probabilities for the plurality of historical trip-requesting sessions being converted to trips;

deduplicating the plurality of feature vectors by keeping one of multiple feature vectors corresponding to a same rider and a same subscription product to obtain a plurality of deduplicated feature vectors respectively corresponding to the plurality of riders, wherein the deduplication comprises:

extracting rider features and subscription features from each of the multiple feature vectors;

determining if a tuple comprising the extracted rider features and subscription features has a conflict in a hash table, wherein the determining comprises generating a hash index based on the tuple, and determining if the hash index of the tuple exists in the hash table;

in response to that the hash index of the tuple does not exist in the hash table, storing the hash index of the tuple in the hash table; and in response to that the hash index of the tuple exists in the hash table, skipping the feature vector;

feeding the plurality of deduplicated feature vectors to a third machine learning model to predict a plurality of second probabilities of the plurality of riders subscribing one or more of the plurality of subscription products;

jointly training the first machine learning model, the second machine learning model, and the third machine learning model based on the plurality of first probabilities, the plurality of second probabilities, and the plurality of historical trip-requesting sessions;

determining a plurality of optimal subscription products by solving an optimization model constructed based on the trained first machine learning model, the trained second machine learning model, and the trained third machine learning model, wherein a solution of the optimization model includes optimal values of a plurality of parameter vectors representing the plurality of optimal subscription products; and identifying one or more of the plurality of optimal subscription products for a given rider based on the given rider's features and conditions; and sending the one or more identified optimal subscription products to the given rider.

2. The method of claim 1, wherein the constructing an optimization model comprises:

constructing one or more key performance indicator (KPI) models based on the trained second machine learning model and the trained third machine learning model; and constructing the optimization model with an objective function comprising a weighted sum of the KPI models and with the plurality of parameter vectors as decision variables.

3. The method of claim 1, wherein the feeding the plurality of feature vectors to a second machine learning model comprises:

for each of the plurality of historical trip-requesting sessions, feeding the corresponding feature vector and a plurality of session-level features of the historical trip-requesting session to the second machine learning model, wherein the plurality of session-level features comprises at least one of the following:

a price displayed by the ride-hailing platform to a rider;
a discount displayed by the ride-hailing platform to the rider;
estimated time to arrive (ETA) for pick-up;
estimated route distance to destination;
time;
an origin location; and
a destination location.

4. The method of claim 1, wherein each of the plurality of feature vectors comprises a set of rider-level features of the corresponding historical trip-requesting session and a parameter vector representing a context-based subscription product that provides a discount to the corresponding historical trip-requesting session.

5. The method of claim 4, wherein the plurality of rider-level features of the corresponding historical trip-requesting session comprises at least one of the following:

an average price of the rider's historical trips; or
the rider's subscription history.

6. The method of claim 1, wherein each of the plurality of parameter vectors defines one of the plurality of subscription products and comprises at least one of the following values:

a premium of the one subscription product;
a discount amount or percentage of the one subscription product;
a period of validity of the one subscription product; or
a trip count limit of the one subscription product.

7. The method of claim 1, wherein the jointly training the first machine learning model, the second machine learning model, and the third machine learning model comprises:

training the first machine learning model and the second machine learning model together; and
training the third machine learning model based on the trained first machine learning model.

8. The method of claim 1, wherein the jointly training the first machine learning model, the second machine learning model, and the third machine learning model comprises:

training the first machine learning model and the third machine learning model together; and
training the second machine learning model based on the trained first machine learning model.

9. The method of claim 1, wherein each of the first machine learning model, the second machine learning model, and the third machine learning model comprises:

a Multi-layer Perceptrons (MLP) neural network; or
a Restricted Boltzmann Machines (RBM) neural network.

10. The method of claim 1, wherein the KPI models comprise at least one of the following: a net income model, a gross merchandise value (GMV) model, or a number of trips model.

11. A system comprising one or more processors and one or more non-transitory computer-readable memories coupled to the one or more processors, the one or more non-transitory computer-readable memories storing instructions that, when executed by the one or more processors, cause the system to perform operations comprising:

obtaining a plurality of historical trip-requesting sessions between a plurality of riders and a ride-hailing platform, and a plurality of historical context-based subscription products offered to the plurality of riders, wherein the plurality of historical context-based subscription products respectively correspond to a plurality of transportation contexts, and when a trip requested by a trip-requesting session satisfies one of the plurality of transportation contexts, the corresponding context-based subscription applies a benefit to the trip;

feeding the plurality of historical trip-requesting sessions and the plurality of historical context-based subscription products into a first machine learning model to generate a plurality of feature vectors respectively corresponding to the plurality of historical trip-requesting sessions;

feeding the plurality of feature vectors to a second machine learning model to predict a plurality of first probabilities for the plurality of historical trip-requesting sessions being converted to trips;

deduplicating the plurality of feature vectors by keeping one of multiple feature vectors corresponding to a same rider and a same subscription product to obtain a plurality of deduplicated feature vectors respectively corresponding to the plurality of riders, wherein the deduplication comprises:

extracting rider features and subscription features from each of the multiple feature vectors;
determining if a tuple comprising the extracted rider features and subscription features has a conflict in a hash table, wherein the determining comprises generating a hash index based on the tuple, and determining if the hash index of the tuple exists in the hash table;
in response to that the hash index of the tuple does not exist in the hash table, storing the hash index of the tuple in the hash table; and
in response to that the hash index of the tuple exists in the hash table, skipping the feature vector;

feeding the plurality of deduplicated feature vectors to a third machine learning model to predict a plurality of second probabilities of the plurality of riders subscribing one or more of the plurality of subscription products;

jointly training the first machine learning model, the second machine learning model, and the third machine learning model based on the plurality of first probabilities, the plurality of second probabilities, and the plurality of historical trip-requesting sessions;

determining a plurality of optimal subscription products by solving an optimization model constructed based on the trained first machine learning model, the trained second machine learning model, and the trained third machine learning model, wherein a solution of the optimization model includes optimal values of a plurality of parameter vectors representing the plurality of optimal subscription products; and identifying one or more of the plurality of optimal subscription products for a given rider based on the given rider's features and conditions; and sending the one or more identified optimal subscription products to the given rider.

12. The system of claim 11, wherein the constructing an optimization model comprises:

constructing one or more key performance indicator (KPI) models based on the trained second machine learning model and the trained third machine learning model; and constructing the optimization model with an objective function comprising a weighted sum of the KPI models and with the plurality of parameter vectors as decision variables.

13. The system of claim 11, wherein the feeding the plurality of feature vectors to a second machine learning model comprises:

for each of the plurality of historical trip-requesting sessions, feeding the corresponding feature vector and a plurality of session-level features of the historical trip-requesting session to the second machine learning model, wherein the plurality of session-level features comprises at least one of the following:

a price displayed by the ride-hailing platform to a rider;

a discount displayed by the ride-hailing platform to the rider;

estimated time to arrive (ETA) for pick-up;

estimated route distance to destination;

time;

an origin destination; or a destination location.

14. The system of claim 11, wherein each of the plurality of parameter vectors defines one of the plurality of subscription products and comprises at least one of the following values:

a premium of the one subscription product;

a discount amount or percentage of the one subscription product;

a period of validity of the one subscription product; or a trip count limit of the one subscription product.

15. The system of claim 11, wherein the jointly training the first machine learning model, the second machine learning model, and the third machine learning model comprises:

training the first machine learning model and the second machine learning model together; and training the third machine learning model based on the trained first machine learning model.

16. A non-transitory computer-readable storage medium storing instructions that, when executed by one or more processors, cause the one or more processors to perform operations comprising:

obtaining a plurality of historical trip-requesting sessions between a plurality of riders and a ride-hailing platform, and a plurality of historical context-based subscription products offered to the plurality of riders, wherein the plurality of historical context-based subscription products respectively correspond to a plurality of transportation contexts, and when a trip requested by a trip-requesting session satisfies one of the plurality of transportation contexts, the corresponding context-based subscription applies a benefit to the trip;

feeding the plurality of historical trip-requesting sessions and the plurality of historical context-based subscription products into a first machine learning model to generate a plurality of feature vectors respectively corresponding to the plurality of historical trip-requesting sessions;

feeding the plurality of feature vectors to a second machine learning model to predict a plurality of first probabilities for the plurality of historical trip-requesting sessions being converted to trips;

deduplicating the plurality of feature vectors by keeping one of multiple feature vectors corresponding to a same rider and a same subscription product to obtain a plurality of deduplicated feature vectors respectively corresponding to the plurality of riders, wherein the deduplication comprises:

extracting rider features and subscription features from each of the multiple feature vectors;

determining if a tuple comprising the extracted rider features and subscription features has a conflict in a hash table, wherein the determining comprises generating a hash index based on the tuple, and determining if the hash index of the tuple exists in the hash table;

in response to that the hash index of the tuple does not exist in the hash table, storing the hash index of the tuple in the hash table; and in response to that the hash index of the tuple exists in the hash table, skipping the feature vector;

feeding the plurality of deduplicated feature vectors to a third machine learning model to predict a plurality of second probabilities of the plurality of riders subscribing one or more of the plurality of subscription products;

jointly training the first machine learning model, the second machine learning model, and the third machine learning model based on the plurality of first probabilities, the plurality of second probabilities, and the plurality of historical trip-requesting sessions;

determining a plurality of optimal subscription products by solving an optimization model constructed based on the trained first machine learning model, the trained second machine learning model, and the trained third machine learning model, wherein a solution of the optimization model includes optimal values of a plurality of parameter vectors representing the plurality of optimal subscription products; and identifying one or more of the plurality of optimal subscription products for a given rider based on the given rider's features and conditions; and sending the one or more identified optimal subscription products to the given rider.

17. The storage medium of claim 16, wherein the constructing an optimization model comprises:

constructing one or more key performance indicator (KPI) models based on the trained second machine learning model and the trained third machine learning model; and constructing the optimization model with an objective function comprising a weighted sum of the KPI models and with the plurality of parameter vectors as decision variables.

18. The storage medium of claim 16, wherein the feeding the plurality of feature vectors to a second machine learning model comprises:

for each of the plurality of historical trip-requesting sessions, feeding the corresponding feature vector and a plurality of session-level features of the historical trip-requesting session to the second machine learning model, wherein the plurality of session-level features comprises at least one of the following:

a price displayed by the ride-hailing platform to a rider;
a discount displayed by the ride-hailing platform to the rider;
estimated time to arrive (ETA) for pick-up;
estimated route distance to destination;
time;
an origin location; and
a destination location.

19. The storage medium of claim 16, wherein each of the plurality of parameter vectors defines one of the plurality of subscription products and comprises at least one of the following values:

a premium of the one subscription product;
a discount amount or percentage of the one subscription product;
a period of validity of the one subscription product; or
a trip count limit of the one subscription product.

* * * * *